Aug. 25, 1942.        J. W. WILKINSON        2,294,261
OIL FILTER CASING
Filed July 20, 1939
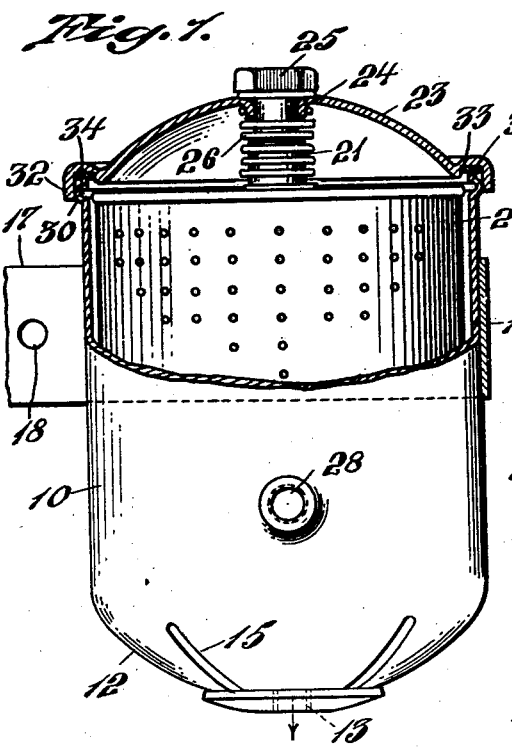
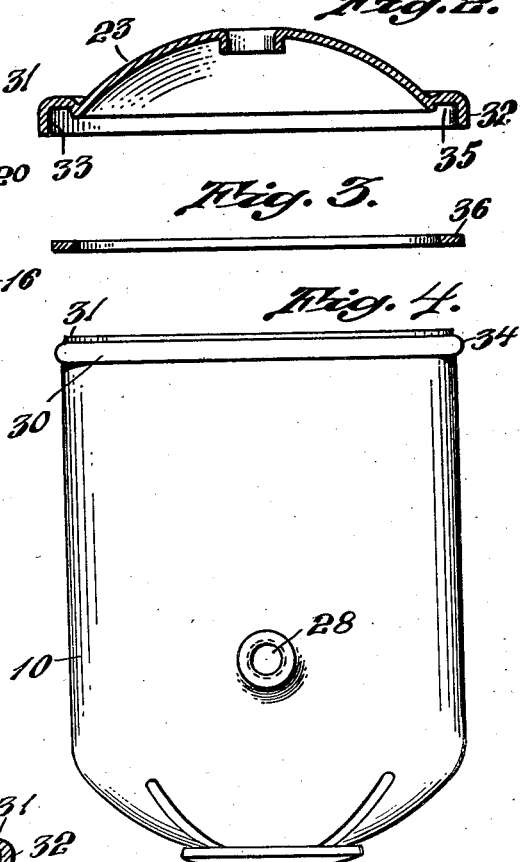
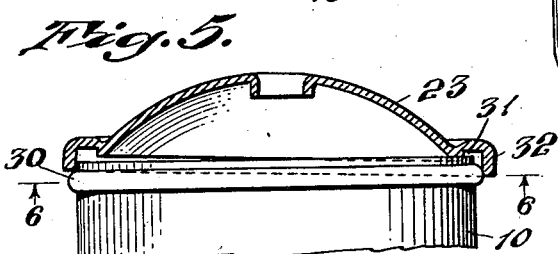
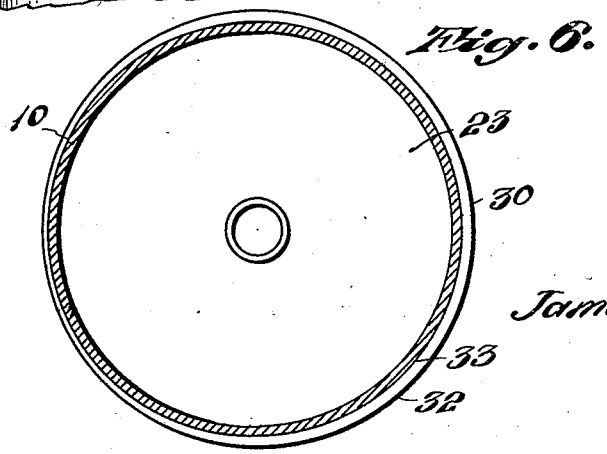
INVENTOR.
James W. Wilkinson.
BY Barlow & Barlow
ATTORNEYS.

Patented Aug. 25, 1942

2,294,261

UNITED STATES PATENT OFFICE 2,294,261

OIL FILTER CASING

James W. Wilkinson, Providence, R. I., assignor to Fram Corporation, a corporation of Rhode Island Application July 20, 1939, Serial No. 285,476

9 Claims. (Cl. 220—42)

This invention relates to oil filters, and in particular to improvements in the filter casing for oil filters adapted for use with continuous-flow, pressure lubricating systems of internal combustion engines; and has for one of its objects to provide means for holding and retaining the annular gasket which seals the removable cover and the open end of the casing to the proper diameter and in correct operative relation when the parts are assembled.

Another object of the invention is to provide means to maintain a definite distance between the edge of the open end of the filter casing and the depending lip of the removable cover encircling the outside of the casing.

Another object of the invention is to provide a means cooperating with the filter casing and the lip of the cover capable of exerting pressure on the casing to force it back into a round condition should it be distorted.

Another object of the invention is to provide means associated with the filter casing and the lip of the cover for automatically centering the open end face of the casing with respect to the center of the sealing gasket carried by the cover during assembly of the cover on the casing.

Another object of the invention is to provide means carried by the cover for not only centering the open end of the casing but also serving as a part of a retainer element for holding the cover sealing gasket in place on the cover.

With these and other objects in view, the invention consists of certain novel features of construction, as will be more fully described, and particularly pointed out in the appended claims In the accompanying drawing:

Fig. 1 is an elevational view of a filter in accordance with the invention, the parts being broken away and shown in section to illustrate the construction;

Fig. 2 is a central sectional view of the cover;

Fig. 3 is a central sectional view of the gasket;

Fig. 4 is an elevational view of the casing;

Fig. 5 is a view of a fragmental portion of the casing with the cover being shown in section and illustrating the manner in which it is applied to the casing but before the compression of the gasket; and Fig. 6 is a sectional view substantially on the line 6—6 of Fig. 5.

It has been found in the manufacture of cylindrical filter casings which comprise a thin sheet metal shell open at the upper end and having a closed bottom that such casings are at times found with the side walls in an out-of-round condition or are of non-cylindrical contour. When such filters are put into use difficulty is experienced in providing a proper seal and centering of the gasket between the cover and the upper end of the casing due to the out-of-round condition of the periphery of the end face of the casing; and in order to overcome the aforementioned disadvantages I have provided an annular beading or outwardly projecting rib around and in close proximity to the open end of the casing adapted to co-act with a downwardly extending lip on the removable cover whereby the securing of the latter on the casing will cause the lip to slide over and exert a wedging action on the beading of the casing which action, due to the deformability of the stock of the casing serves to force the casing back into a substantially round condition; and as a further feature I provide an annular groove in the underside of the cover adjacnt to and associated with the downwardly extending lip thereof, which groove holds the annular gasket for sealing the open end of the casing in its proper place and insures that it is retained in the proper rounded form and diameter, and I so locate this groove with respect to the downwardly extending lip of the cover that the lip will coact with the beading or rib in such a manner that they will bring the open end face of the casing back to round and at the same time center the gasket with respect to the end of the casing, and the following is a more detailed description of the present embodiment of this invention, illustrating the preferred means by which these advantageous results may be accomplished:

In the drawing, 10 designates a casing of generally cylindrical form having an end wall 12 which bulges outwardly and is of generally rounded contour and provided with a central lubricant opening 13 adapted to be connected to a suitable conduit. The end wall 12 may be either smooth or provided with a plurality of reinforcing ribs 15 for strengthening the wall against collapse within the casing. Provided intermediate of the casing 10 is a metal clamping band 16 of a length sufficient to substantially embrace the casing and provided with outwardly bent ends 17 in which are suitably formed openings 18 for receiving a suitable bolt (not shown) for mounting the casing on a suitable support, such as the rear face of the dash of a motor vehicle.

The other end of the casing 10 is open, as shown in Fig. 1, for insertion into the casing or withdrawal therefrom of an annular filter cartridge unit 20 which surrounds the usual longitudinally extending central perforated tube 21 that communicates with the lubricant opening 13 and is disposed in spaced relation to the side walls of the casing. The open end of the casing is closed by the removable cover 23 having a central opening 24 through which passes a bolt 25 having screw threaded engagement within the upper end of the central perforated tube 21 whereby turning movement of the bolt 25 in a direction to tighten the same serves to move the cover toward the casing and secure the cover in tightly closed position on the casing and also acts to compress a spring 26, which surrounds the bolt 25 and the central tube 21 and is interposed between the inner wall of the cover and the top of the casing, to apply pressure on the top of the filter cartridge 20 to firmly retain the same seated in proper operating position within the filter casing. A lubricant opening 28 is also provided at an intermediate portion of the side wall of the casing, and preferably constiutes the inlet opening for the filter.

In order to bring the casing back into a substantially round condition should same be distorted slightly from such shape I have provided an outwardly projecting annular rib or beading 30 around the periphery of the casing and in close proximity to the end face 31 of the open end of the casing 10. The cover 23 is of generally arched shape and is provided with a downwardly extending annular flanged rim or lip 32, the inner surface 33 of which coacts with the rounded outer surface 34 of the beading 30 when the cover is being drawn down tightly into closed position by the bolt 25 in order to produce a wedging action between the bead and the rim 32 whereby the fixed circular rim 32 will serve to force inwardly the out-of-round portions of the casing at the area of the beading due to the heavy gauge of the stock of which the cover is composed. The inside face 33 of the annular rim 32 of the cover forms one wall of an annular groove 35, formed in the underside of the cover 23, which groove 35 serves to hold and retain the annular sealing gasket 36 of cork or other usual material in the cover and maintain the gasket in its proper rounded form and proper diameter. The width of the groove 35 and the gasket 36 are such that in positioning the rim 32 of the cover in place over the beading such action will at the same time center the end face 31 of the casing in the center of the gasket 36.

It will thus be seen that in accordance with my invention I have provided simple and effective means for providing a fluid tight joint between the cover and the casing and also to insure that the part will be maintained with a definite distance between the edge of the casing and the lip of the cover for all diametrical positions whereby any out-of-roundness of the casing may be overcome and the latter will be restored to a substantially round state.

This also makes the finishing of the end surface of the edge of the casing as a precision operation unnecessary and strengthens the casing when the cover is assembled thereon.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a filter, a filter casing unit comprising a shell open at its upper end and having a surrounding wall terminating edge uppermost and presenting a flat sealing surface, a removable cover for closing the open end of said casing, rotatable means for releasably securing said cover in closed position over the open end of said casing, and means associated with said cover and the casing for forcing said casing back into a substantially round condition, if the same is initially in an out-of-round condition, in response to the turning movement of said cover securing means to secure the cover into tightly closed position on the casing, said means comprising an outwardly projecting rounded rib around the outside of the casing and in close proximity to but spaced from the open end thereof, and a rigid downwardly extending lip on said cover for engaging said rib and coacting therewith to exert a wedging action on the casing to bring about the result desired when the cover is secured into a tightly closed position on the casing.

2. In a filter, a filter casing unit comprising a shell open at its upper end and having a surrounding wall terminating edge uppermost and presenting a flat sealing surface, a removable cover for closing the open end of said casing, rotatable means for releasably securing said cover in closed position over the open end of said casing, and means associated with said cover and the casing for forcing said casing back into a substantially round condition, if the same is initially in an out-of-round condition, in response to the turning movement of said cover securing means to secure the cover into tightly closed position on the casing, said means comprising an outwardly projecting rounded rib around the outside of the casing and in close proximity to but spaced from the open end thereof, and a rigid downwardly extending lip on said cover for engaging said rib and coacting therewith to exert a wedging action on the casing to bring about the result desired when the cover is secured into a tightly closed position on the casing, and an annular groove in said cover for holding an annular flat-sided sealing gasket to proper diameter and in proper operative relation for engagement with the flat sealing surface of the upper end face of the casing, the lip forming one wall of the groove and coacting with the rounded rib to center the gasket with the end face of the casing.

3. In a filter, a filter casing unit comprising a shell open at its upper end and having a wall terminating upwardly and presenting an upper flat edge sealing surface, a removable cover for closing the open end of said casing and presenting a sealing surface adjacent to the marginal portion of the cover, movable means for releasably urging said cover to closed position and said sealing surfaces into sealing cooperation with each other, an outwardly projecting narrow guiding rib on the casing spaced downwardly from said upper edge surface, and a lip on said cover to telescopically engage said rib for forcing said casing back into a substantially round condition, if the same is initially in an out-of-round condition, in response to the tightening movement of said means to urge the cover into closed position on the casing.

4. In a filter, a casing comprising a shell opening upwardly and having a surrounding cylindrical wall with its upper end terminating edge uppermost and provided with straight inner and outer sides adjacent said edge, a guiding rib extending outwardly from said wall at a location spaced downwardly from said upper edge, a cover having a top wall and a downwardly extending lip surrounding the same, a gasket within said lip, said lip having its inner cylindrical wall engaging said rib and guiding said cover to seated position, said rib extending outwardly beyond said edge an extent sufficient to locate the edge substantially midway between the outer and inner peripheries of said gasket.

5. In a filter, a casing comprising a shell opening upwardly and having a surrounding cylindrical wall with its upper end terminating edge uppermost and presenting a flat sealing surface in a single plane at right angles to the axis of the casing and provided with straight inner and outer sides adjacent said edge, a guiding rib extending outwardly from said wall and spaced downwardly from said upper edge, a cover having a top wall and a downwardly extending lip surrounding the same, a gasket within said lip, said lip engaging said rib and guiding said cover to seated position, said rib extending outwardly beyond said edge an extent sufficient to locate the upper flat sealing edge substantially midway between the outer and inner peripheries of said gasket.

6. In a filter, a casing comprising a shell opening upwardly and having a surrounding wall with its terminating edge uppermost and presenting a flat sealing surface in a single plane at right angles to the axis of the casing and provided with straight inner and outer sides adjacent said edges, a narrow guiding rib extending outwardly from said wall and spaced downwardly from said upper edge, a cover having a top wall and a downwardly extending lip surrounding the same, a recess in the under surface of the top wall of the cover adjacent said lip, a gasket in said recess, said lip telescopically engaging said rib and guiding said cover to seated position, said rib extending outwardly beyond said edge an extent sufficient to locate the upper flat sealing surface of said edge substantially midway between the outer and inner peripheries of said gasket.

7. In a filter, a casing comprising a shell opening upwardly and having a surrounding wall with its terminating edge uppermost and presenting a flat sealing surface in a single plane at right angles to the axis of the casing and a narrow convexedly curved guiding rib extending outwardly from said wall around the exterior of the casing and spaced downwardly from said upper edge a distance substantially not greater than the thickness of the wall of the casing, a cover having a top wall and a downwardly extending lip surrounding the same, an annular recess in the under surface of the top wall of the cover adjacent said lip, an annular gasket in said recess, said recess and gasket being of a width substantially twice the thickness of the edge of said wall, said lip telescopically engaging said rib and guiding said cover as it is moved to final closed position to cause the edge of said casing to seat centrally of said gasket.

8. In a filter, a casing comprising a shell having an open upper end and a closed lower end, said casing having an inlet and an outlet for fluid, and a cylindrical body portion providing a chamber for housing a filter cartridge and having a surrounding side wall terminating edge uppermost to present a flat sealing surface in a single plane at right angles to the axis of the casing, the upper free marginal portion of said side wall of the casing having concentric interior and exterior cylindrical surfaces which extend downwardly from said upper sealing edge to form a narrow rim around the exterior of the upper end of the casing of a width substantially equal to the thickness of the edge of said wall; a removable cover for closing the open end of said casing and presenting a sealing surface adjacent to the marginal portion of the cover adapted to engage the flat sealing surface of said upper edge; movable fastening means releasably securing and exerting pressure downwardly upon said cover for urging it into final closed position and for forcing said sealing surfaces into fluid-tight sealing cooperation; an outwardly projecting narrow guiding rib arranged circularly around the exterior of said casing adjacent the lower end of said upper rim; and a downwardly extending cylindrical marginal lip on said cover of a size and interior diameter for telescopically engaging said rib for forcing said casing back into a substantially round condition, if the same is initially in an out-of-round condition, in response to the tightening movement of said fastening means to urge the cover to final closed position on the casing.

9. In a filter, a casing comprising a shell having an open upper end and a closed lower end, said casing having an inlet and an outlet for fluid, and a cylindrical body portion providing a chamber for housing a filter cartridge and having a surrounding side wall terminating edge uppermost to present a flat sealing surface in a single plane at right angles to the axis of the casing, the upper free marginal portion of said side wall of the casing having concentric interior and exterior cylindrical surfaces which extend downwardly from said upper sealing edge to form a narrow rim around the exterior of the upper end of the casing of a width substantially equal to the thickness of the edge of said wall; a removable cover for closing the open end of said casing; a recess in the underside of said cover adjacent its marginal portion, a gasket in said recess for sealing cooperation with the flat sealing surface of said upper edge, said recess and said gasket being of a width substantially twice the thickness of the upper edge of said wall; movable fastening means releasably securing and exerting pressure downwardly upon said cover for urging it into final closed position and for forcing said sealing surfaces into fluid-tight sealing cooperation; an outwardly projecting narrow guiding rib arranged circularly around the exterior of said casing adjacent the lower end of said upper rim; and a downwardly extending cylindrical marginal lip on said cover of a size and interior diameter for telescopically engaging said rib for forcing said casing back into a substantially round condition, if the same is initially in an out-of-round condition, in response to the tightening movement of said fastening means to urge the cover to final closed position on the casing, said rib extending outwardly from said wall an extent to coact with said lip and locate said flat upper sealing edge substantially centrally of said gasket in the final closed position of said cover.

JAMES W. WILKINSON.